E. R. MEYER.
COOKING UTENSIL.
APPLICATION FILED NOV. 24, 1914.
1,160,934.
Patented Nov. 16, 1915.
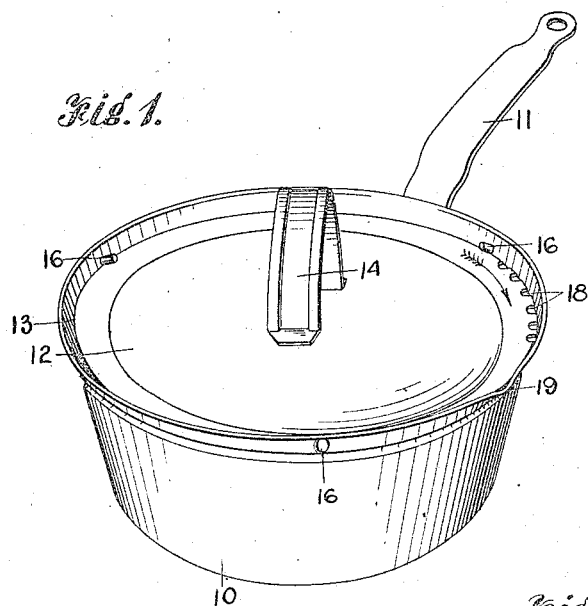
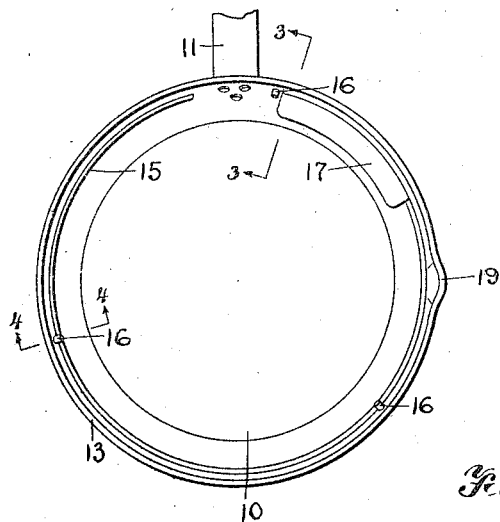
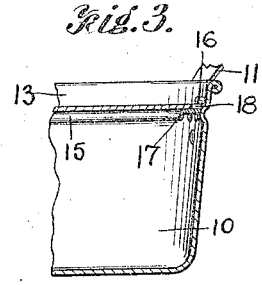
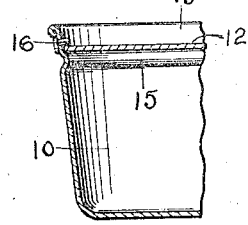
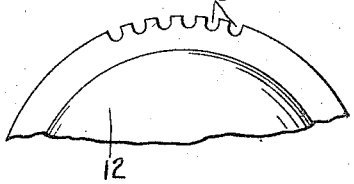
WITNESSES
INVENTOR
Emma R. Meyer
BY
ATTORNEYS

UNITED STATES PATENT OFFICE.

EMMA R. MEYER, OF NEW YORK, N. Y.

COOKING UTENSIL.

1,160,934.  Specification of Letters Patent.  Patented Nov. 16, 1915.

Application filed November 24, 1914.  Serial No. 873,745.

*To all whom it may concern:*

Be it known that I, EMMA R. MEYER, a citizen of the United States, and a resident of the city of New York, borough of Manhattan, in the county and State of New York, have invented a new and Improved Cooking Utensil, of which the following is a full, clear, and exact description.

This invention relates to cooking utensils, and has particular reference to kettles or pans used for stewing or boiling vegetables or the like.

Among the objects of the invention is to provide a utensil of the character indicated which has a lid substantially close-fitting and adapted to be held in position so that when in one position the steam will be practically held within the utensil and in another position openings are provided through which the water or juices may be drained off, the lid supporting and retaining means insuring that the operator cannot be scalded or burned, and, furthermore, whereby the device may be manipulated for the purpose of draining off the water by the use of one hand only.

The foregoing and many other objects of the invention will hereinafter be more fully described and claimed and illustrated in the drawings forming a part of this specification in which like characters of reference indicate corresponding parts in all the views, and in which—

Figure 1 is a perspective view showing the utensil complete with the lid in position closed; Fig. 2 is a plan view of the same with the lid omitted; Figs. 3 and 4 are vertical sectional details on lines corresponding to lines 3—3 and 4—4 of Fig. 2, but with the lid in position; and Fig. 5 is a detail plan view of a part of the lid.

The several parts of this device may be made of any suitable materials, and the relative sizes and proportions, as well as the general design of the mechanism, may be varied to a considerable extent without departing from the spirit of the invention hereinafter more fully described and specifically claimed.

Referring more particularly to the drawings, I show at 10 a receptacle of any suitable size, form or material and which, for convenience of description, will be referred to hereinafter by the broad term "pan". The pan is provided with any suitable character of handle such as shown at 11, riveted or otherwise rigidly secured at one side thereof in a well known manner, and whereby the operator by a single hand may manipulate the pan for all purposes.

At 12 I show a lid of circular form and adapted to fit into the rim portion 13 of the pan. The lid is preferably provided with a handle 14 for lifting and rotating it.

The periphery of the lid as above premised is adapted to fit substantially snugly within the rim 13 of the pan, and when the lid is on the pan it rests upon any suitable support shown as a bead 15 formed in or upon the inner surface of the pan and marking thereby the lower edge of the rim 13. At 16 I provide two or three lugs formed in or upon the rim 13 of the pan in any suitable manner and of a rigid nature. Said lugs are shown herein as three in number and in the nature of studs extending through the rim 13 and beyond the inner surface of the rim and spaced from the bead or support 15 a distance equal to the thickness of the periphery of the lid as shown best in Figs. 3 and 4.

At 17 is a horizontal lip formed in or upon the support 15 and having its upper surface in the same plane as the upper surface of the support. In other words, the periphery of the lid rests upon the support and said lip when in closed position and is held snugly against the support by the lugs 16. By grasping the handle 14, however, the lid may be rotated around its axis or the vertical axis of the pan with facility.

The periphery of the lid is notched as shown at 18 for a short distance, a distance not longer than the circumferential length of the lip 17. In putting the lid in place upon the pan, the side thereof opposite the notches 18 is slipped beneath the two lugs 16 opposite the lip 17, and the notched portion of the lid may then pass downwardly past the other lug 16, the notches being so arranged or proportioned that any one of them will pass downwardly over this lug. The notched portion of the lid then will come into place upon the upper surface of the lip, and by giving the lid a slight rotation in the direction of the arrow, Fig. 1, it will be locked beneath all of the lugs and the notches 18 will be closed by the lip. In this position the lid may remain while the cooking is taking place.

When it is desired to drain off the water and juices from the vegetables being cooked, a further rotation of the lid in the same direction will bring the notches 18 past the end of the lip, and in such position that the water may flow therethrough and over the spout 19 formed as usual in the rim of the pan. The lugs in this position of the lid will continue holding it firmly in connection with the pan so that the lid will retain the vegetables while the pan is being tilted.

I claim:—

1. In a cooking utensil, the combination of a pan having a horizontal circumferential support formed upon its inner surface, a lip formed upon said support and having its upper surface substantially flush with the upper surface of said support, and a plurality of lugs extending inwardly from the top of the pan above the support, one of said lugs being adjacent one end of said lip, and a lid for the pan having a circular periphery and adapted to fit upon the upper surface of said support and lip and beneath said lugs, said lid periphery being formed with a series of notches of less circumferential extent than the length of said lip, substantially as set forth.

2. In a cooking utensil, the combination of a pan having a horizontal supporting bead formed on the inner surface thereof, a lip projecting inwardly from one portion of the bead in a plane parallel to the bottom of the pan, and a plurality of lugs extending inwardly from the upper portion of the pan above and closely spaced from the bead, and a lid having a circular periphery adapted to interlock in the pan between the bead and said lugs, said lid having on one side a notched portion adapted to pass one of said lugs, the notched portion being closed by said lip in one position of rotation of the lid beneath the lugs and the notched portion being adapted to pass beyond the end of the lip for drainage purposes while the lid is held by the lugs from tilting when the pan is tilted.

In testimony whereof I have signed my name to this specification in the presence of two subscribing witnesses.

EMMA R. MEYER.

Witnesses:
GEO. L. BEELER,
PHILIP D. ROLLHAUS.